United States Patent
Sack (10) Patent No.: US 7,633,771 B2
(45) Date of Patent: Dec. 15, 2009

(54) METHOD AND CIRCUIT FOR CONTROLLING A RECTIFIER

(75) Inventor: Lothar Sack, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 51 days.

(21) Appl. No.: 11/568,665

(22) PCT Filed: May 10, 2005

(86) PCT No.: PCT/EP2005/052102

§ 371 (c)(1),
(2), (4) Date: Nov. 3, 2006

(87) PCT Pub. No.: WO2005/112244

PCT Pub. Date: Nov. 24, 2005

(65) Prior Publication Data

US 2007/0223257 A1    Sep. 27, 2007

(30) Foreign Application Priority Data

May 11, 2004    (DE)    ........................ 10 2004 023 299

(51) Int. Cl.
*H02M 5/45* (2006.01)
*H02M 5/458* (2006.01)

(52) U.S. Cl. ............................. 363/37; 363/34; 363/52; 363/81; 363/84; 363/125

(58) Field of Classification Search .................... 363/34, 363/37, 125, 126, 127
See application file for complete search history.

(56) References Cited

U.S. PATENT DOCUMENTS 5,481,451  A       1/1996  Kuwahara
6,125,045  A *    9/2000  Nishikawa et al. ............ 363/37
7,227,331  B2 *   6/2007  Galli et al. .................. 318/808

(Continued)

FOREIGN PATENT DOCUMENTS

DE    35 39 027 A1    5/1987

(Continued)

OTHER PUBLICATIONS

Manfred Winkelnkemper; Steffen Bernet: "Design and Optimization of the DC-Link Capacitor of PWM Voltage Source Inverter with Active Frontend for Low-Voltage Drives", EPE, 2003, Toulouse, ISBN: 90-75815-07-7.

(Continued)

*Primary Examiner*—Edward Tso
*Assistant Examiner*—Johali A Torres Ruiz
(74) *Attorney, Agent, or Firm*—Henry M. Feiereisen; Ursula B. Day (57) ABSTRACT

A method for controlling a rectifier, connected to an AC power network, of a drive converter which is provided with a load-end pulse-controlled rectifier is disclosed. An electronically controlled switch is electrically connected in parallel to every diode of the rectifier. The switching operations of the switches are produced in a manner synchronized with the conduction phases of the associated network-commutated phase voltages and independently of the phase voltages of the supply network. Every switching operation produced is released upon arrival of the next zero value at the rectifier end. The network-end switching operations are linked with the load-end zero values, thereby allowing switching operations to be carried out in a currentless manner.

10 Claims, 6 Drawing Sheets

U.S. PATENT DOCUMENTS

2002/0089864 A1* 7/2002 Kalman et al. ............... 363/34
2004/0032755 A1* 2/2004 Pollanen et al. ............... 363/71
2004/0136210 A1* 7/2004 Oh ............................ 363/37

FOREIGN PATENT DOCUMENTS

DE 3539027 A * 5/1987
DE 199 13 634 A1 9/2000
EP 1 289 112 A2 3/2003

OTHER PUBLICATIONS

K. Göpfrich, C. Rebbereh, L. Sack: Fundamental Frequency Front End Converter (F3E)—a DC-link drive converter without electrolytic capacitorFundamental Frequency Front End Converter (F3E)—a DC-link drive converter without electrolytic capacitor, May 2003.

Joos G et al.: "A new class of current-controlled suppressed-link AC to AC frequency changers", Proceedings of the Annual Power Electronics Specialists Conference, Massachussetts, Jun. 25-27, 1991, New York, IEEE, US, Bd. Conf. 22, June 24, 1991, Seiten 830-837, XP010048407, ISBN: 0-7803-0090-4, Absatz 'OIIAI; Abbildungen 2,3.

Siyoung Kim et al—"AC to AC power conversion based on matrix converter topology with unidirectional switches", Applied Power Electronics Conference And Exposition, 1998, APEC '98, Conference Proceedings 1998. Thirteenth Annual Anaheim, CA, USA, Feb. 15-19, 1998, New York, NY USA, IEEE, US, Bd. 1, Feb. 15, 1998, Seiten 301-307, XP010263810, ISBN: 0-7803-4340-9, Absatz '00III; Abbildungen 3, 4.

* cited by examiner

METHOD AND CIRCUIT FOR CONTROLLING A RECTIFIER

BACKGROUND OF THE INVENTION

The invention relates to a method and circuit for controlling a rectifier, which is connected to an AC power supply system on its input side and a pulse-controlled inverter on its load side.

In drive technology, there is frequently a requirement for an uncontrolled, power supply system-commutated rectifier of simple design in order to feed a DC intermediate circuit in a drive converter from a three-phase power supply system, in which case the requirement to draw and/or to supply a current which is as sinusoidal as possible from and to the power supply system is not of importance. Since the converter is not only intended to drive the three-phase motor which is supplied with a variable three-phase voltage and at a variable frequency, but also to brake it a current flow must, however, be possible in both directions.

In the braking mode, energy flows from the motor via the load-side inverter into the DC intermediate circuit, and from there into the power supply system. This is not possible in the case of uncontrolled rectifiers which contain only diodes. Electronically switchable braking resistors, which convert the braking energy that is produced to heat, must therefore be arranged in the power supply input for drive converters with diode bridges.

However, if the aim is to feed the braking energy back into the supplying power supply system, it is possible to provide a self-commutated pulse-controlled converter with semiconductor switches which can be switched off, in particular insulated-gate bipolar transistors (IGBTs) instead of a rectifier. This self-commutated pulse-controlled converter can be operated as a rectifier or as an inverter. This self-commutated pulse-controlled converter is therefore also referred to as a self-commutated, pulsed, input/output feed unit, or as an active front end (AFE). The power supply system current is virtually sinusoidal as a result of the use of an active front end, that is to say the reactions on the power supply system are minimal.

In comparison to an unregulated input-feed unit, the intermediate-circuit voltage can be regulated by means of the self-commutated, pulsed input/output feed unit. The disadvantage is the high costs and the high level of complexity. In the event of stringent requirements relating to the reactions on the power supply system or when a high braking power is produced, there is no other alternative to the use of an input/output feed unit such as this, even if there is no need for a regulated intermediate-circuit voltage.

DE 35 39 027 A1 discloses a further embodiment of a drive converter, which has an uncontrolled rectifier on the power supply system side and two diodes (which are electrically connected in series) with electronically controllable switches connected in parallel with them, for each voltage phase. Furthermore, this drive converter has an auxiliary rectifier, which is terminated on the DC-voltage side by a high-impedance burden resistor and, in series with each of its auxiliary diodes, has a current sensor, in particular an optocoupler with a downstream amplifier, which is used to drive an electronically controllable switch. This auxiliary rectifier generates control signals in such a manner that each electronically controllable switch is switched on in synchronism with the on-phases of the associated power supply system-commutated diodes. The rectifier in the drive converter is thus forward-biased bidirectionally for both current directions, and is nevertheless of the power supply system-commutated, uncontrolled type. The advantage of this drive converter is that the rectifier does not require any complex control and regulation electronics. Although the rectifier uses valves which can be switched off, the DC voltage is as high as that in the case of an uncontrolled rectifier. The valves which can be switched off switch only at the power supply system frequency, and after being switched off the voltage across them rises only slowly, so that thyristors which can be switched off are also suitable for use as electronically controllable switches.

The publication "Fundamental Frequency Front End Converter ($F^3E$)—a DC-link drive converter without electrolytic capacitor" by Kurt Göpfrich, Dr. Carsten Rebbereh and Dr. Lothar Sack, PCIM 2003, Nürnberg, May 2003 discloses a drive converter which has an uncontrolled rectifier on the power supply system side, and a self-commutated pulse-controlled converter on the load side. The two converters are connected directly electrically in parallel on the DC voltage side, that is to say neither an intermediate-circuit capacitor nor an intermediate-circuit inductor is arranged in the so-called DC voltage intermediate circuit. Each diode in the rectifier on the power supply system side is connected electrically in parallel with an electronically controllable switch, in particular an insulated gate bipolar transistor (IGBT). A filter circuit, comprising filter inductors and filter capacitors, is arranged between the power supply system connections and the input connections of the converter on the power supply system side. A comparator circuit is provided for generation of control signals for these electronically controllable switches, and is linked on the input side to the power supply system which feeds it. This comparator circuit and its operation are dealt with in detail in DE 199 13 634 A1, so that it will not be explained in any more detail at this point.

The switching operations of the electronically controllable switches for the uncontrolled rectifier on the power supply system side when the power supply system-commutated converter for the drive converter is being controlled on the basis of DE 35 39 027 A1 or the PCIM publication are carried out solely on the basis of the general criterion of the power supply system voltages in the power supply system which feeds them. The direct current flowing between the converter on the power supply system side and the converter on the load side is in this case ignored. This current is impressed on the load side, and may be positive, negative or zero depending on the operating state and time. Furthermore, there is no insurance that, during the commutation of the current from one phase to a subsequent phase, that the switch carrying the current and the switch to which the current is being transferred will switch at the same time. This is caused by the determination of the zero crossing of the associated line-to-line voltage which, for example, is in each case present across a filter capacitor in the input-side filter circuit, and the determination of the time of natural commutation. A plurality of states therefore exist as a function of the type of operation, during the commutation process. For example, a delay in switching on a switch to which the current is being transferred during the commutation process in the case of a negative direct current causes disturbance excitation of the entire system in the drive converter in the event of a line-to-line voltage which is greater than, equal to or less than zero, and leads to voltage spikes across the filter capacitors and the electronically controllable switches. These overvoltages that occur must be taken into account in the design of the drive converter.

SUMMARY OF THE INVENTION

The invention is based on the object to provide a control method for controlling a rectifier so that such spikes no longer occur.

In accordance with the invention, this object is achieved by a control method for a rectifier, which is connected to an AC power supply system, for a drive converter which has a pulse-controlled inverter on the load side, with each diode in this rectifier being electrically connected in parallel with an electronically controllable switch whose switching operations are generated in synchronism with the on-phases of the associated power supply system-commutated diodes and as a function of phase voltages of the feeding power supply system, wherein each generated switching operation is allowed on arrival of a next inverter-side zero vector.

Since, according to the method on which the invention is based, the control signals that are produced are passed on only while a load-side zero vector is present, the switching operation takes place only when the intermediate-circuit current is equal to zero. In this operating state, it is irrelevant how the commutation process takes place (overlapping or simultaneously) or whether the zero crossing of a line-to-line voltage has been determined exactly. The switching processes on the power supply system side are linked to the switching states on the load side when using this method according to the invention.

In this case, a distinction must be drawn between two situations, specifically a range up to below the full voltage drive for the load-side pulse-controlled inverter and the range with the full voltage drive. In the range up to below the full voltage drive for the load-side pulse-controlled inverter, the zero vectors occur at short time intervals, since the switching frequency of the pulse-controlled inverter is in the kHz range. Two active vectors and one zero vector are always used for approximation of a nominal voltage vector of the load-side pulse-controlled inverter up to the full voltage drive. Three switched-on durations are calculated for a vector representation time for the three vectors. The switched-on duration for the zero vector is advantageously halved, in order that the vector representation time starts and ends with a zero vector. A second equivalent vector representation time can thus be linked with mirror-image symmetry to the first vector representation time. One zero vector therefore exists in each vector representation time. This vector representation time corresponds to half the pulse period duration. If a requirement occurs for switching in the uncontrolled rectifier, it is possible to determine in a very short time whether a zero vector occurs. If zero vectors are present, the switching takes place with the start of the next zero vector, and thus without any current flowing.

In the case of full voltage control, zero vectors are ignored, in favor of maximizing the voltage. In consequence, the pauses in which no current flows in the intermediate circuit are missing in some places. In order to avoid any excessive switching delay in the power supply system-side converter when a switching requirement occurs in this case, a zero vector is now inserted according to the invention. Of the two possible zero vectors of the load-side pulse-controlled inverter, that is selected which requires the switching of only one switch pair in the pulse-controlled inverter. A pause during which no current flows in the intermediate circuit in this drive converter therefore also occurs in the full voltage drive range, and the switching in the power supply system-side converter likewise takes place with no current flowing. Since this process takes only a short time this measure has no practical effect on the load.

According to another feature of the present invention, the presence of an inverter-side zero vector can be determined as a function of the output voltages from the load-side pulse-controlled inverter.

According to another feature of the present invention, the presence of an inverter-side zero vector can be determined as a function of the control signals of the load-side pulse-controlled inverter.

According to another feature of the present invention, the full voltage drive operating state is determined as a function of a predetermined drive level.

The advantages of the control method according to the invention comprise, owing to the switching processes being carried out with no current flowing, in the power supply system-side electronically controllable switches, a reduction in the load on these switches as a result of the absence of switching losses, and a reduction in the switching-dependent excitations in the entire system.

BRIEF DESCRIPTION OF THE DRAWING

In order to explain the invention further, reference is made to the drawing in which a plurality of embodiments of the circuit arrangement according to the invention are illustrated schematically, and in which:

FIG. 5 shows a drive converter with a first embodiment of the circuit arrangement according to the invention, while

DETAILED DESCRIPTION OF PREFERRED EMBODIMENTS

Figure 1:
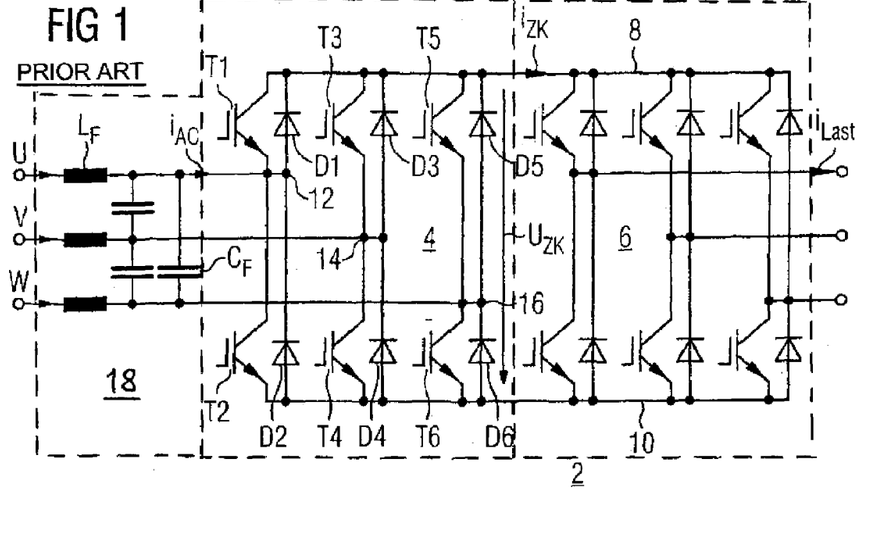
FIG. 1 shows an equivalent circuit of a known drive converter without a voltage intermediate circuit.

FIG. 1 shows an equivalent circuit of a drive converter 2, which is known from the PCIM publication. This known drive converter 2 has a rectifier 4 on the power supply system side, and a self-commutated pulse-controlled converter on the load side. The rectifier 4 and the self-commutated pulse-controlled converter 6 on the load side are directly electrically conductively connected to one another on the DC voltage side by means of a positive and negative busbar 8 and 10. The DC intermediate circuit therefore no longer contains any intermediate-circuit inductor or intermediate-circuit capacitor. A filter circuit 18 is arranged between the connections U, V, W of a power supply system, which is not illustrated in any more detail, and the input connections 12, 14 and 16 on the AC voltage side of the rectifier 4. This filter circuit 18 has filter inductors $L_F$ and filter capacitors $C_F$, with each of these filter inductors $L_F$ being connected in one power supply system supply line, and with the filter capacitors $C_F$ being connected in delta. The power supply system-side converter 4 has two diodes D1, D2; D3, D4 and D5, D6 (which are electrically connected in series) for each voltage phase and are electrically connected so as to produce a three-phase rectifier bridge circuit. A respective electronically controllable switch T1, . . . , T6 is connected electrically in parallel with each diode D1, . . . , D6 in this rectifier 4. Semiconductor switches which can be switched off, in particular IGBTs, are provided as electronically controllable switches T1, . . . , T6.

The control connections of these electronically controllable switches are linked, in accordance with the PCIM publication, to a control device. Since this control device is preferably formed from comparators, it is referred to as a comparator circuit. The detailed design of this comparator circuit can be found in DE 199 13 634 A1.

Figure 2:
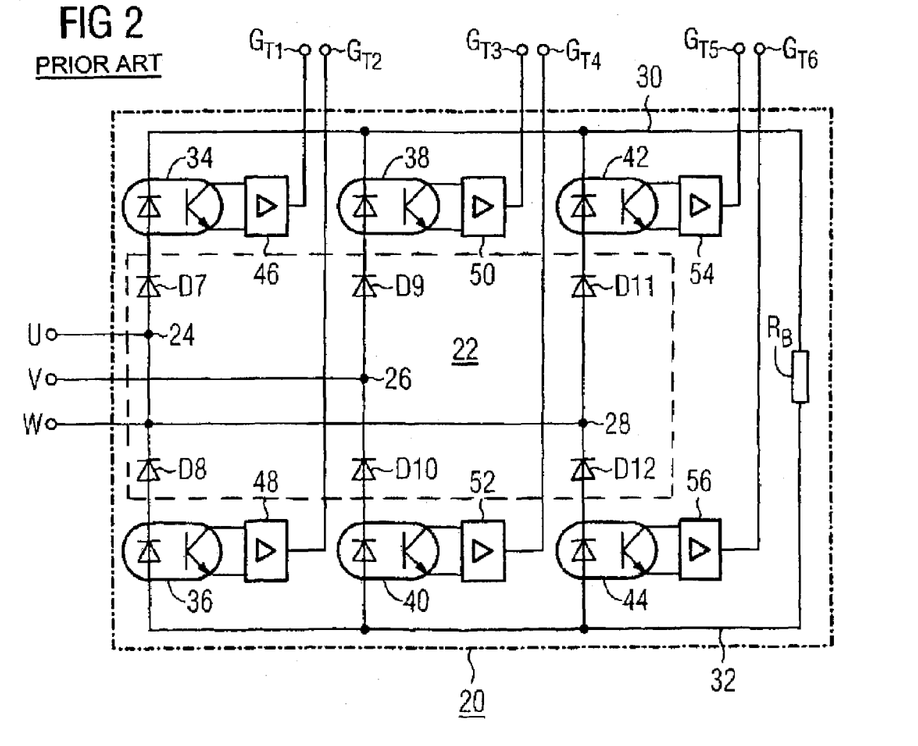
FIG. 2 shows an equivalent circuit of a known control device for generation of control signals for the electronically controllable switches for the rectifier in a known drive converter.
Figure 4:
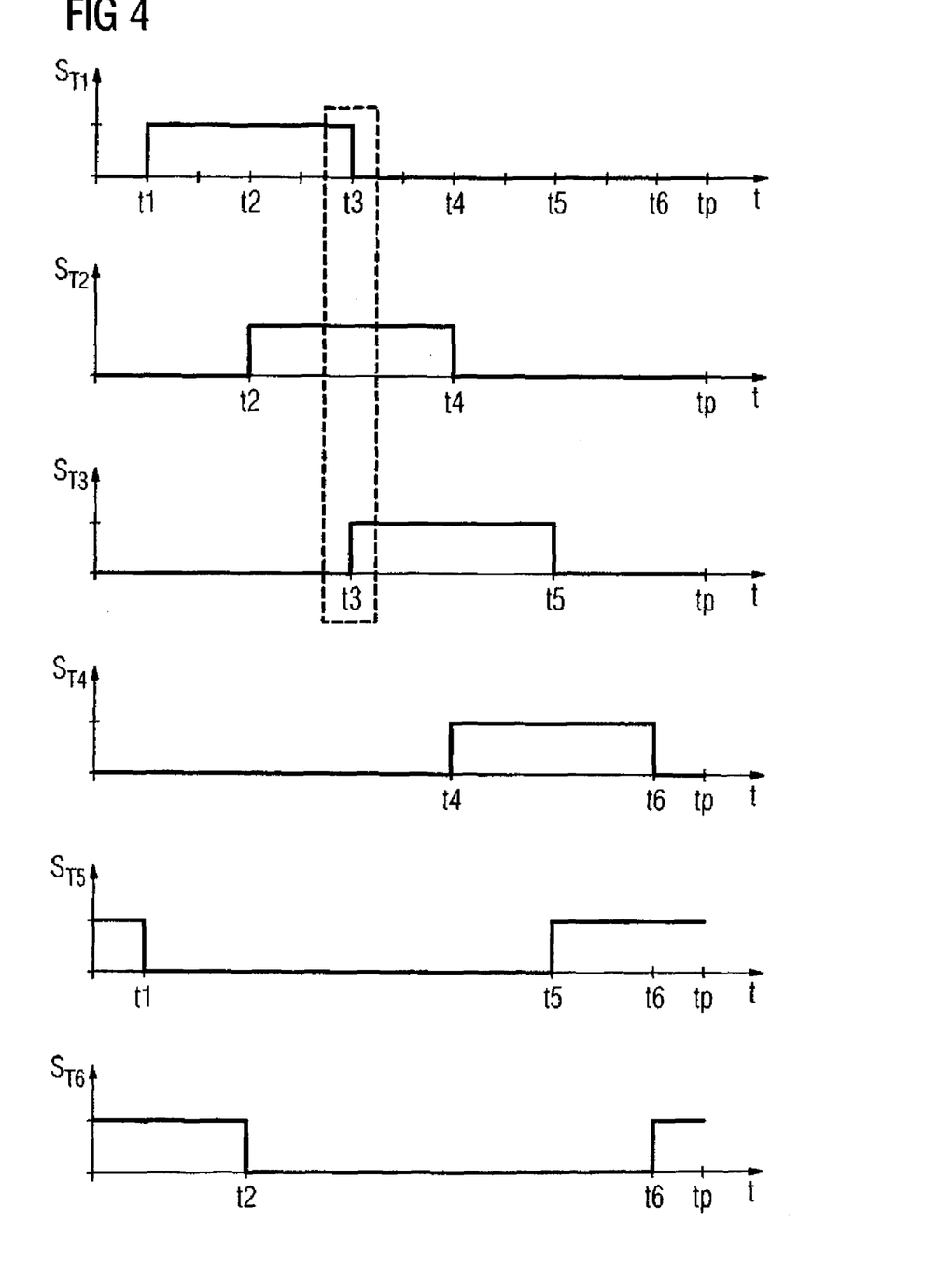

FIG. 2 shows an equivalent circuit of a further control circuit 20, which is already known from DE 35 39 027 A1. This control circuit 20 has an auxiliary rectifier 22, which is terminated on the DC voltage side with a high-impedance burden resistor $R_B$. The inputs 24, 26 and 28 of the auxiliary rectifier 22 are electrically conductively connected to the connections U, V and W of a power supply system which feeds it, but which are not illustrated in any more detail. This auxiliary rectifier 22 comprises six auxiliary diodes D7, D8, D9, D10, D11 and D12, which are connected in a generally known three-phase bridge circuit. An optocoupler 34, 36, 38, 40, 42 and 44 with a transmitting diode is connected as a current sensor between each auxiliary diode D7, . . . , D12 and a respectively associated connection 30 or 32 on the DC voltage side. The phototransistor which is provided for each optocoupler 34, . . . , 44 and is driven by the associated transmitting diode is linked to a respective downstream amplifier 46, 48, 50, 52, 54 and 56. The amplifiers 46, . . . , 56 in this case each generate a switch-on signal $S_{T1}$, $S_{T2}$, $S_{T3}$, $S_{T4}$, $S_{T5}$ and $S_{T6}$ for the electronically controllable switches T1 to T6 for the rectifier 4 in the drive converter 2 as shown in FIG. 1, as a function of the light-emitting transmitting diode. These control signals $S_{T1}$, . . . , $S_{T6}$ are respectively applied to corresponding control connections $G_{T1}$, $G_{T2}$, $G_{T3}$, $G_{T4}$, $G_{T5}$ and $G_{T6}$. These control signals $S_{T1}$ to $S_{T6}$ are each shown plotted against the time t in a graph in FIG. 4.

According to DE 35 39 027 A1, the resistance of the burden resistor $R_B$ is designed such that the burden current $I_{aux}$ which flows when the auxiliary diodes D7 to D12 are in the forward-biased state reaches a small value, which is suitable for the transmitting diodes of the optocouplers 34, . . . , 44 (for example 10 mA).

Figure 3:
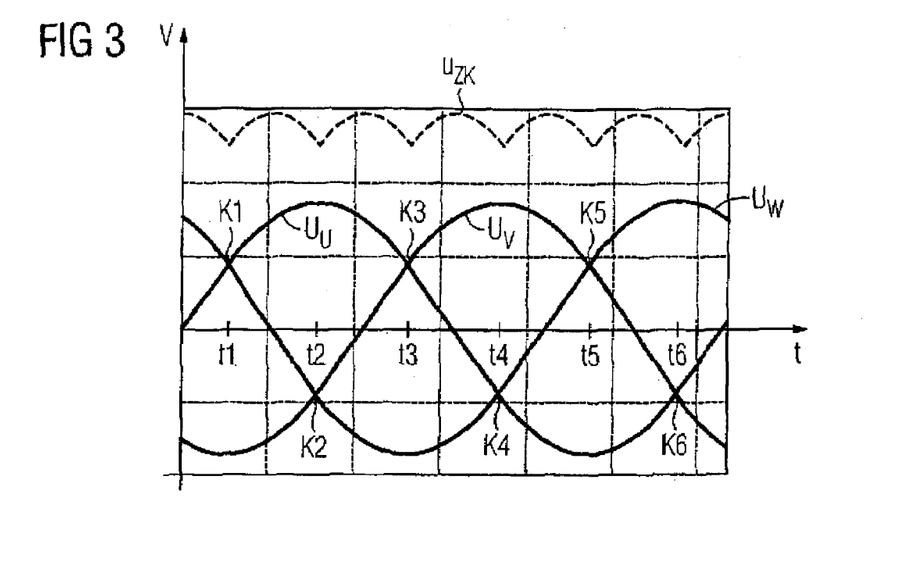
FIG. 3 shows a graph of the power supply system voltages in the power supply system which feeds it and of a rectifier voltage that is produced plotted against the time t, FIG. 4 in each case shows a graph of the control signals for the electronically controllable switches for the rectifier in a known drive converter plotted against the time t.

The phase voltages $U_U$, $U_V$ and $U_W$ of the feeding power supply system are shown in a graph plotted against the time t in FIG. 3. As can be seen from this figure, an intersection K1, . . . , K6 of two phase voltages occurs at each of the times t1 to t6. These intersections K1, . . . , K6 are the natural commutation times of an uncontrolled rectifier. A DC voltage $U_{ZK}$ produced by the rectifier 4 is likewise illustrated, plotted against the time t, in the graph in FIG. 3. A line-to-line voltage which corresponds to the two phase voltages $U_W$, $U_U$; $U_V$, $U_W$; $U_U$, $U_V$; $U_W$, $U_U$; $U_V$, $U_W$ and $U_U$, $U_V$ involved passes through zero at each of these times t1, . . . , t6. This means that this line-to-line voltage changes its mathematical sign. These line-to-line voltages can be tapped off across the filter capacitors $C_F$ in the filter circuit 18 in the drive converter 2 as shown in FIG. 1.

Figure 5:
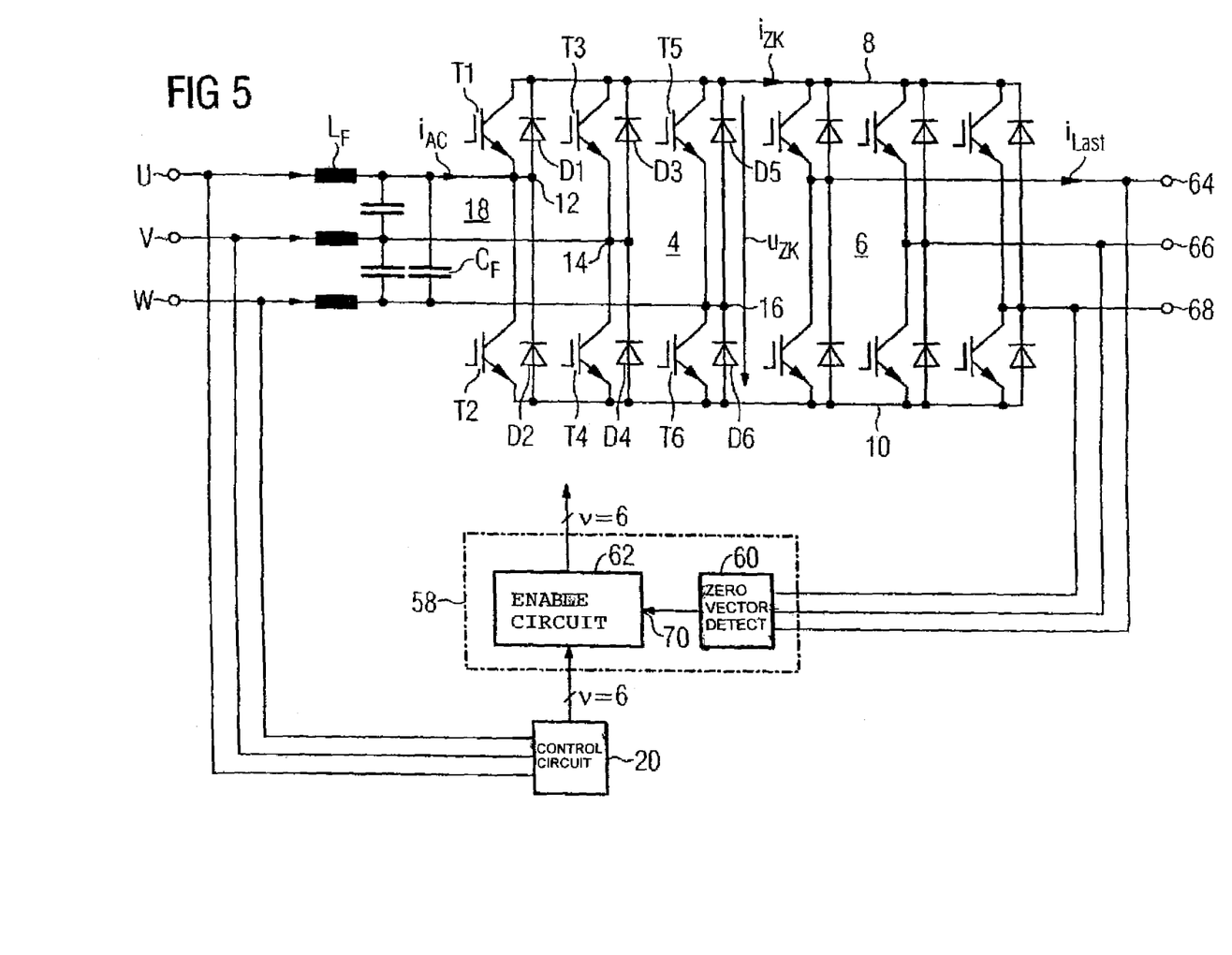

FIG. 5 shows a first embodiment of a circuit arrangement 58 according to the invention for a known drive converter as shown in FIG. 1. The circuit arrangement 58 has a zero-vector detection device 60 and an enable circuit 62. The zero-vector detection device 60 is electrically conductively connected on the input side to load-side connections 64, 66 and 68 of the load-side pulse-controlled inverter 6. On the output side, this zero-vector detection device 60 is linked to a control input 70 of the enable circuit 62. On the input side, this enable circuit 62 is connected to control connections $G_{T1}$ to $G_{T6}$ of the control device 20, which is connected on the input side to the AC power supply system which feeds the drive converter 2. The control device 20 is designed in a corresponding manner to that shown in FIG. 2. The control connections $G_{T1}$ to $G_{T6}$ are not illustrated in detail in FIG. 5, for clarity reasons. On the output side, the enable circuit 62 is linked to control connections of the electronically controllable switches T1 to T6 in the uncontrolled rectifier 4 in the drive converter 2. Only when the zero-vector detection device 60 has detected a zero vector $\underline{U}_0$ or $\underline{U}_7$ are the control signals $S_{T1}$ to $S_{T6}$ which are present on the input side emitted at the outputs of the enable circuit 62 when the next respective zero vector $\underline{U}_0$ or $\underline{U}_7$, respectively, occurs. In this illustration, the zero-vector detection device 60 on the input side is linked to the load-side connections 64, 66 and 68 of the pulse-controlled inverter 6 for the drive converter 2.

Figure 6:
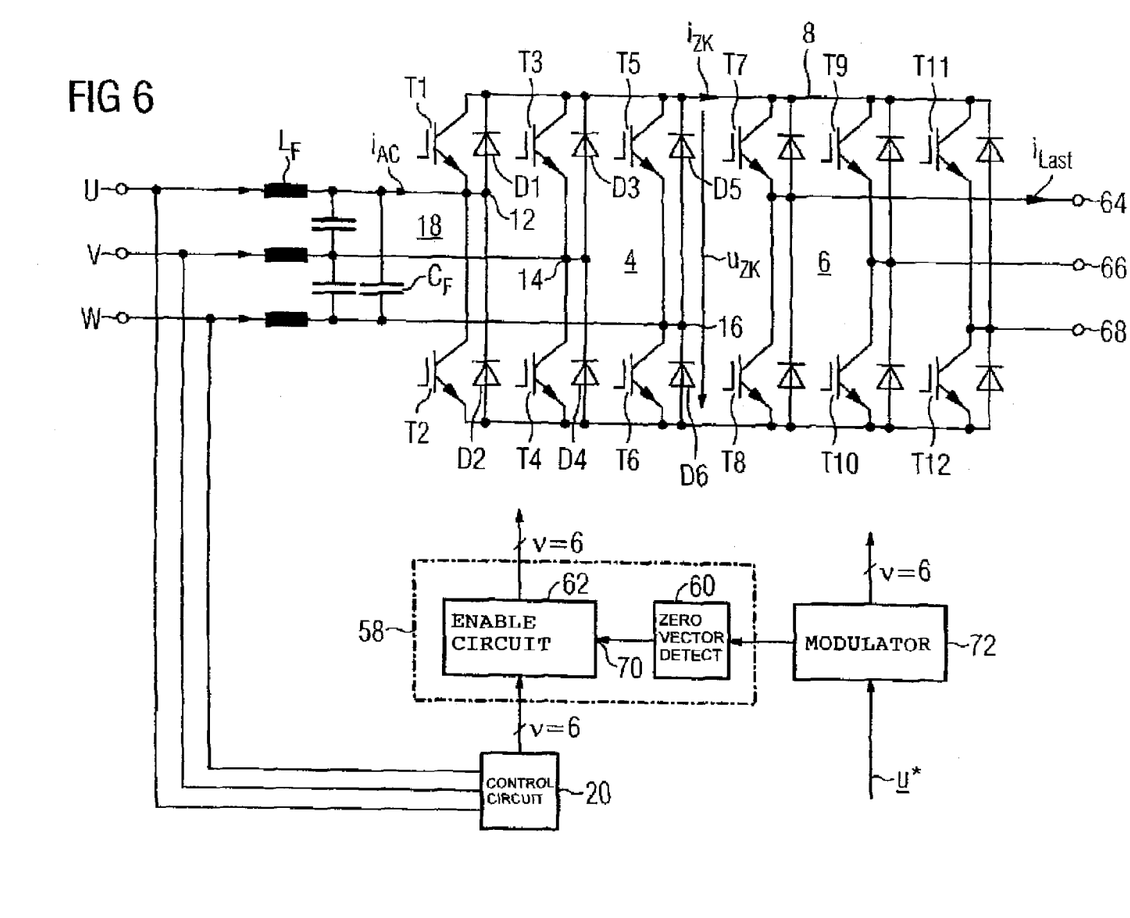
FIG. 6 shows a drive converter with a second embodiment of the circuit arrangement according to the invention.

The illustration shown in FIG. 6 differs from the illustration shown in FIG. 5 in that the zero-vector detection device 60 is now connected to one output of a modulator 72 for the load-side pulse-controlled inverter 6. Since associated control signals for electronically controllable switches T7 to T12, in particular IGBTs, for the load-side pulse-controlled inverter 6 are generated in this modulator 72 from a nominal voltage vector u* that is present it is possible to determine simply by means of a level check whether a zero vector $\underline{U}_0$ or $\underline{U}_7$ is or is not present. This zero-vector detection device 60 can advantageously be integrated in the modulator 72. The enable circuit 62 can likewise be integrated in the control device 20 for the electronically controllable switches T1 to T6 for the uncontrolled rectifier 4 in the drive converter 2. This would reduce the circuit arrangement 58 to a connecting line between the modulator 72 for the load-side pulse-controlled inverter 6 and the control device 20 for the power supply system-side converter 4 for the drive converter 2.

Figure 7:
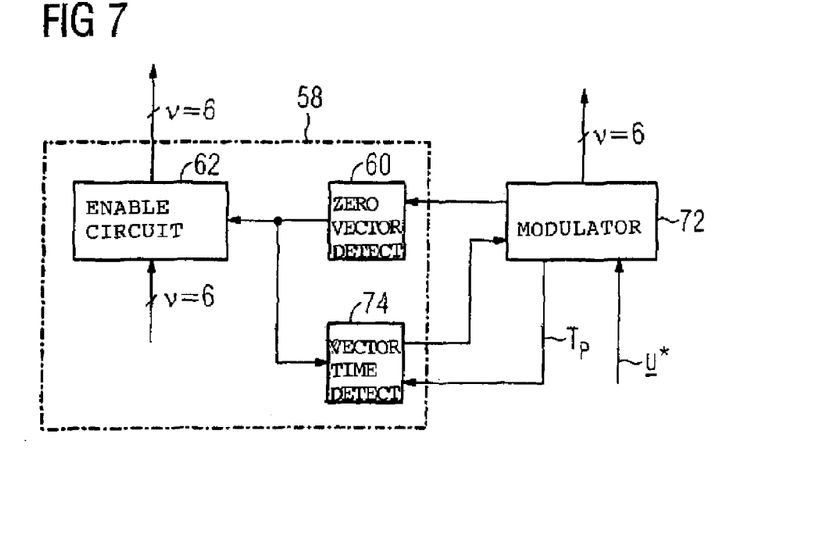
FIG. 7 shows a block diagram of a further embodiment of the circuit arrangement according to the invention, and FIGS. 8 and 9 each show the method according to the invention.

FIG. 7 shows a block diagram of a further embodiment of the circuit arrangement 58 according to the invention. This differs from the embodiment shown in FIG. 6 in that an apparatus 74 is additionally provided. This apparatus 74 determines whether a zero vector $\underline{U}_0$ or $\underline{U}_7$ has been detected in the vector representation time $T_P$. The vector representation time $T_P$ is likewise produced by the modulator 72 for the load-side pulse-controlled inverter 6. If no zero vector $\underline{U}_0$ or $\underline{U}_7$ occurs within a vector representation time $T_P$, and if a switching operation $K_U$ is required for the power supply system-side converter 4, then the apparatus 74 causes the modulator 72 to generate a zero vector $\underline{U}_0$ or $\underline{U}_7$ in the following vector representation time $T_P$. In this case, care must be taken to ensure that, as far as possible, only one switching operation of one switch pair for the pulse-controlled inverter 6 need be carried out. This inserted zero vector $\underline{U}_0$ or $\underline{U}_7$ need be present only until the requested switching operation $K_U$ has been completed in the power supply system-side converter 4. Switching therefore takes place without any current flowing even when the power supply system-side converter 4 has the full voltage drive. This zero vector $\underline{U}_0$ or $\underline{U}_7$ is therefore inserted in order to prevent an excessive switching delay occurring in the power supply system-side converter.

Figure 8:
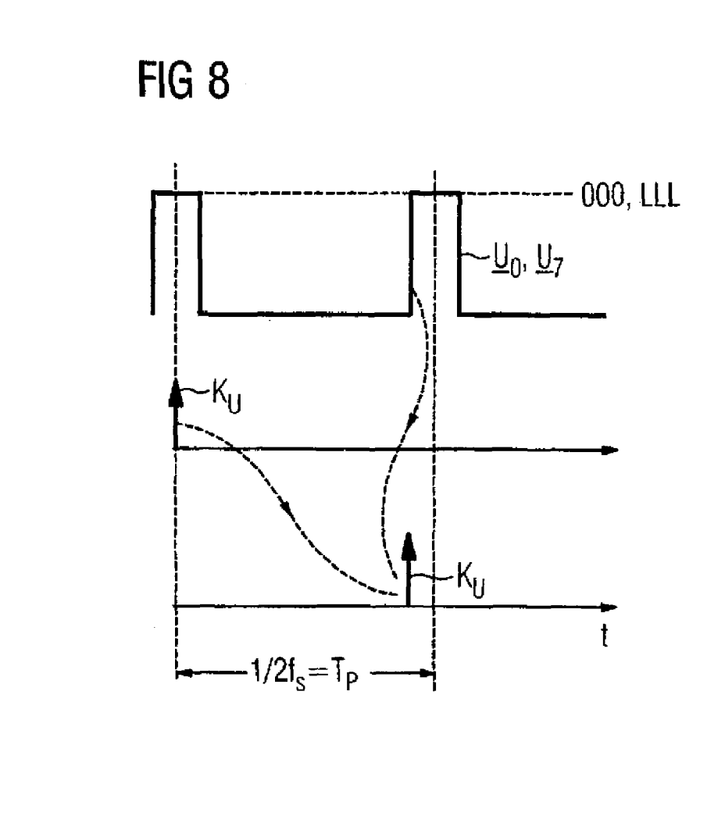
Figure 9:
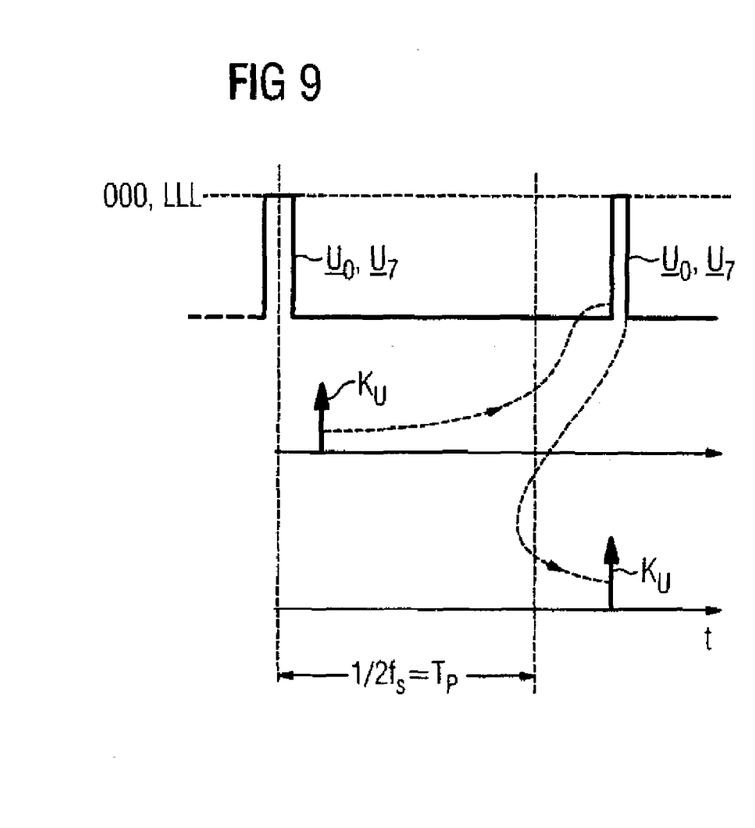

FIGS. 8 and 9 show the method according to the invention in the range below the full voltage drive and in the range of the full voltage drive. According to this method on which the invention is based, and as shown in FIG. 8, it is found that a zero vector $\underline{U}_0$ or $\underline{U}_7$ has occurred at the start of a vector representation time $T_P = \frac{1}{2} f_S$. At the same time, a switching operation $K_U$ for the power supply system-side converter 4 is requested at the start of this vector representation time $T_P$. This requested switching operation $K_U$ is carried out when the next zero vector $\underline{U}_0$ or $\underline{U}_7$ occurs. Since the load-side pulse-controlled inverter 6 implements the zero vector $\underline{U}_0$ or $\underline{U}_7$ while the switching operation $K_U$ is being carried out, no current flows in the intermediate circuit in the drive converter 2. The switching operation $K_U$ in the power supply system-side converter 4 therefore takes place with no current flowing.

According to the method on which the invention is based as shown in FIG. 9, no zero vector $\underline{U}_0$ or $\underline{U}_7$ occurs for a requested switching operation $K_U$. The apparatus 74 therefore causes the modulator 72 to generate a zero vector $\underline{U}_0$ or $\underline{U}_7$. The requested switching operation $K_U$ is carried out with the implementation of this zero vector $\underline{U}_0$ or $\underline{U}_7$ in the next vector representation time $T_P$. This zero vector $\underline{U}_0$ or $\underline{U}_7$ need be present only until the switching operation $K_U$, for example the commutation between the electronically controllable switches T1 and T3 for the power supply system-side converter 4, has been carried out. Since this process takes only a short time, this measure has no practical effect for a load on the outputs 64, 66 and 68 of the load-side pulse-controlled inverter 6. As already mentioned, the one of the two possible zero vectors $\underline{U}_0$ or $\underline{U}_7$ of the pulse-controlled inverter 6 which is selected is that which requires only one switch operation in the pulse-controlled inverter 6. The insertion of a zero vector $\underline{U}_0$ or $\underline{U}_7$ in the full voltage drive range results in the switching process being carried out in the power supply system-side converter 4 with no current flowing.

Since the switching processes in the power supply system-side converter 4 are carried out with no current flowing, switching losses no longer occur, so that the load on the electronically controllable switches T1 to T6 for the uncontrolled rectifier 4 is reduced. Furthermore, this reduces the switching-dependent excitations in the entire system.

What is claimed is:

1. A control method for controlling a converter with a self-commutated rectifier, which is electrically connected to an AC power supply system, and a load-side pulse-controlled inverter, which is directly connected to a DC output of the rectifier without an intermediate DC-link capacitor, the rectifier including diodes electrically connected in parallel with electronically controllable switches in one-to-one correspondence, said method comprising the steps of:
   detecting an inverter-side zero vector based on an AC-side voltage of the load-side inverter, and
   operating the electronically controllable switches in synchronism with on-phases of the diodes, as a function of phase voltages of the AC power supply system upon arrival of a next inverter-side zero vector.

2. The control method of claim 1, further comprising the step of generating an inverter-side zero vector when a switching operation is present and when the load-side pulse-controlled inverter for the drive converter has a full voltage drive.

3. The control method of claim 1, further comprising the step of determining when an inverter-side zero vector is present as a function of output voltages from the load-side pulse-controlled inverter.

4. The control method of claim 1, further comprising the step of determining when an inverter-side zero vector is present as a function of the control signals of the load-side pulse-controlled inverter.

5. The control method of claim 1, further comprising the step of checking each vector representation time of the load-side pulse-controlled inverter to determine when an inverter-side zero vector is present.

6. The control method of claim 1, further comprising the step of determining when the load-side pulse-controlled inverter for the drive converter has a full voltage drive as a function of a predetermined drive level.

7. A control circuit for a rectifier in a drive converter, which has a load side pulse-controlled inverter, with the rectifier being electrically connected to an AC power supply system and including diodes electrically connected in parallel with electronically controllable switches in one-to-one correspondence, said circuit comprising:
   a control device connected to the AC power supply system;
   a zero-vector detection device having an input side connected to load-side connections of the pulse-controlled inverter; and
   an enable circuit having an input side, which is connected to an output side of the control device, an output side, which is connected to control connections of the electronically controllable switches, and a control side, which is connected to the zero-vector detection device.

8. A control circuit for a rectifier in a drive converter, which has a load side pulse-controlled inverter, with the rectifier being electrically connected to an AG power supply system and including diodes electrically connected in parallel with electronically controllable switches in one-to-one correspondence, said control circuit comprising:
   a control device connected to the AC power supply system;
   a zero-vector detection device having an input side connected to output side connections of a modulator of the pulse-controlled inverter;
   an enable circuit having an input side, which is connected to output-side connections of the control device, an output side, which is connected to control connections of the electronically controllable switches, and a control side, which is connected to an output of the zero-vector detection device.

9. The control circuit of claim 8, further comprising a vector time detection device having an input side, which is connected to the zero-vector detection device and connected to a clock output of the modulator, and an output side, which is connected to a control input of the modulator.

10. The control circuit of claim 8, wherein the enable circuit and the zero detection device are at least partially integrated in the control device for the rectifier and in the modulator of the load-side pulse-controlled inverter, wherein the modulator has an enable output which is connected to a control input of the control device.

* * * * *